Nov. 3, 1925.
G. BOEHMLER
AUTOMOBILE HEADLIGHT
Filed Oct. 7, 1922
1,560,376
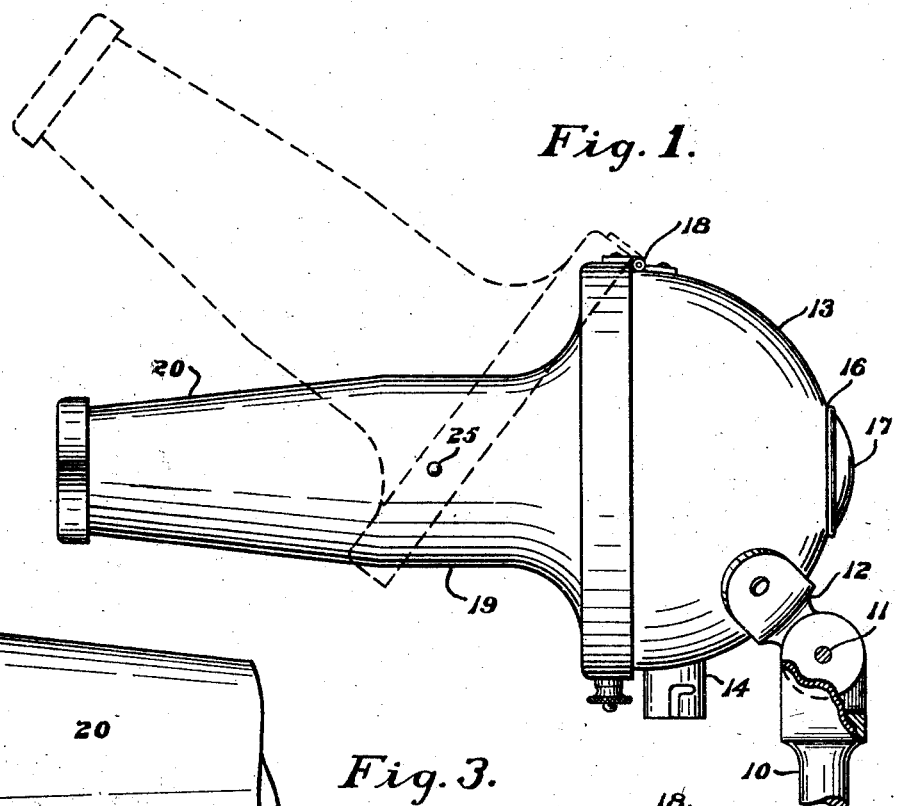
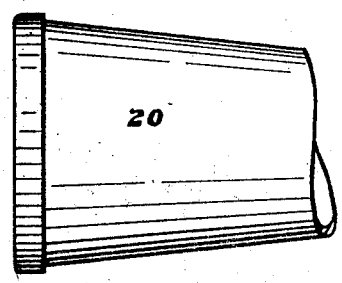
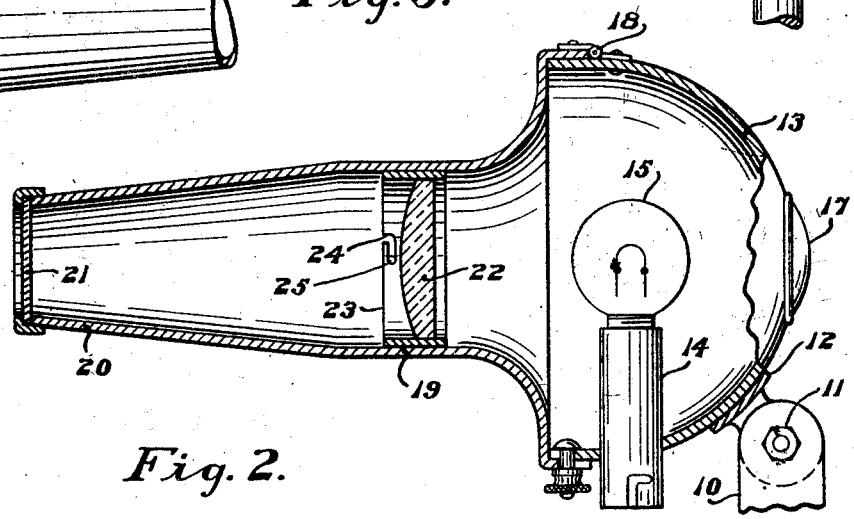
George Boehmler
INVENTOR
BY Victor J. Evans
ATTORNEY Patented Nov. 3, 1925.

1,560,376

UNITED STATES PATENT OFFICE.

GEORGE BOEHMLER, OF ROCKLEDGE, PENNSYLVANIA.

AUTOMOBILE HEADLIGHT.

Application filed October 7, 1922. Serial No. 593,061.

*To all whom it may concern:*

Be it known that I, GEORGE BOEHMLER, a citizen of the United States, residing at Rockledge, in the county of Montgomery and State of Pennsylvania, have invented new and useful Improvements in Automobile Headlights, of which the following is a specification.

This invention relates to automobile head lights. The particular object is to provide a device of this nature which shall be so constructed as to cast a light in a single beam upon the road way, the light being collected focused by simple and improved means.

Another object is to produce a device of this nature which shall be movable so as to direct the light as desired, whereby any objectionable glare may be eliminated for pedestrians and the light may be brought to bear on the road where desired.

Another object is to construct a device of this nature in such manner as to constantly notify the driver of the vehicle as to whether his lamp is lighted or not.

Other objects are to construct a device of this nature which shall be simple of construction, consisting of few parts, using no reflectors, simple to operate and clean and highly efficient for the purpose for which it is designed.

With these and other objects in view which will become more apparent as this specification proceeds, the invention resides in certain novel features of construction and combination and arrangement of parts, the essential features of which are hereinafter fully described, are particularly pointed out in the appended claim and are illustrated in the accompanying drawing, in which:

Fig. 1 is a side elevation of my improved headlight showing in full lines the closed position, and in dotted lines the open position of the front portion of the lamp.

Figure 2 is a vertical longitudinal sectional view.

Figure 3 is a top plan view of the light projecting top.

Like numerals of reference refer to like parts in all views.

Referring to the drawing in detail, 10 represents a base or pedestal which may be of any suitable well known construction and which is pivotally connected at 11 with hinge elements 12 of the lamp proper.

Secured to the members 12 is a rear body element 13 of substantial hemi-spherical form in the lower part of which is arranged a lamp socket 14 in which may be seated the usual electric lamp 15. The rear portion of the member 13 is formed with a small opening 16 closed by a piece of glass 17 permitting the throwing of a small beam of light rearwardly so as to constantly indicate to the driver the condition of the lamp, and to illuminate the side of the car so as to avoid accidents. Hingedly mounted at 18 is a front body member 19 including an elongated tubular portion 20, said tubular member having the same vertical diameter throughout or having a greater horizontal axis at its vertical end than the horizontal axis at its rear end. This construction causes the light beam thrown through the tubular member to be broadened horizontally on the road and confines the light against vertical projection.

Mounted at the front end of the tubular member 20 is a plain glass 21 which serves to keep the dust out of the tubular body and off the lens 22. The lens 22 is provided with a circular form 23 formed with bayonet slots 24 and pins 25 projecting inwardly over the tubular member 20 near its inner end. It will of course be understood that in designing the lamp for actual service the distance from the light bulb 15 to the lens 22 must be accurately determined.

What I claim is:

A vehicle headlight comprising a light carrying housing having an open side, a substantially tubular light guiding member having an outwardly flared end and an annular flange about the flared end encompassing the open side of the light carrying housing, said tubular light guiding member being of uniform diameter for a portion of its length outwardly from the flared portion and gradually decreasing in diameter from the outer end of the uniform portion to its outer end, a flat lens carried at the outer end of the tubular portion, a lens carrying ring mounted in the portion of the tube of the uniform diameter, and a lens carried by said lens carrying ring.

In testimony whereof I affix my signature.

GEORGE BOEHMLER.